(12) United States Patent
Mulder et al.

(10) Patent No.: US 7,334,807 B2
(45) Date of Patent: Feb. 26, 2008

(54) VEHICLE STEP TUBE

(75) Inventors: Craig C. Mulder, Dorr, MI (US);
Charles J. Steffens, Ada, MI (US)

(73) Assignee: Steffens Enterprises, Inc., Caledonia, MI (US)

(*) Notice: Subject to any disclaimer, the term of this patent is extended or adjusted under 35 U.S.C. 154(b) by 237 days.

(21) Appl. No.: 10/993,312

(22) Filed: Nov. 19, 2004

(65) Prior Publication Data
US 2005/0263975 A1 Dec. 1, 2005

Related U.S. Application Data

(63) Continuation-in-part of application No. 10/855,265, filed on May 27, 2004, now Pat. No. 7,168,721.

(51) Int. Cl.
*B60R 3/00* (2006.01)
(52) U.S. Cl. ...................... 280/163; 280/169
(58) Field of Classification Search .............. 280/163, 280/164.1, 164.2, 166, 169, 762, 770; 293/117
See application file for complete search history.

(56) References Cited

U.S. PATENT DOCUMENTS

| | | | | |
|---|---|---|---|---|
| 3,774,952 A | * | 11/1973 | Zorn ........................ 293/117 |
| 4,311,320 A | * | 1/1982 | Waters, Jr. ................ 280/163 |
| 4,451,063 A | * | 5/1984 | Snyder ..................... 280/163 |
| 4,456,275 A | * | 6/1984 | Snyder et al. ............. 280/163 |
| 4,935,638 A | * | 6/1990 | Straka ................... 280/164.1 |
| 4,943,085 A | * | 7/1990 | Straka ..................... 280/770 |
| 6,173,979 B1 | * | 1/2001 | Bernard .................... 280/163 |
| 6,267,398 B1 | * | 7/2001 | Lombard ................. 280/163 |
| 6,409,193 B2 | * | 6/2002 | Bernard .................... 280/163 |
| 6,588,782 B2 | | 7/2003 | Coomber et al. |
| 6,688,621 B2 | * | 2/2004 | Benirschke .............. 280/163 |
| 7,168,721 B2 | * | 1/2007 | Mulder .................... 280/163 |

* cited by examiner

*Primary Examiner*—Christopher P. Ellis
*Assistant Examiner*—Bridget Avery
(74) *Attorney, Agent, or Firm*—Warner Norcross & Judd LLP

(57) ABSTRACT

A vehicle step tube comprising a one-piece elongated extrusion having a plurality of vertical ribs extending from the upper surface, the ribs define a plurality of channels between the ribs. The ribs may be relatively short in a step portion of the extrusion to form a step platform, and may be relatively tall in the flanking portions flanking the step portion. The ribs may further define transverse recesses in the step portion to enhance traction and aesthetics. A pair of end caps may be provided to cover the ends of the extrusion. The ends caps include openings aligned with the channels to allow fluid flow through the channels and the openings and into an environment.

16 Claims, 21 Drawing Sheets

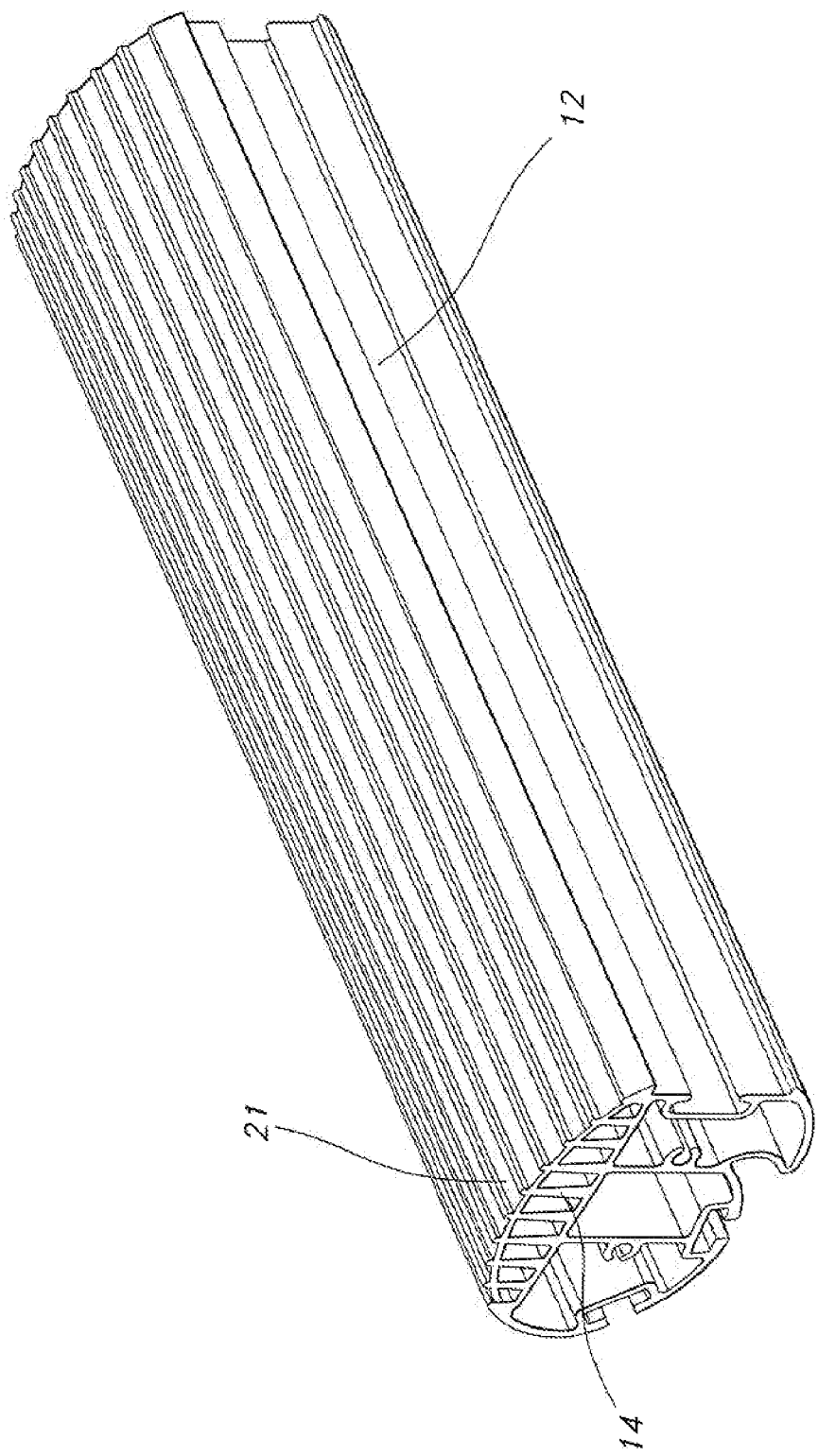

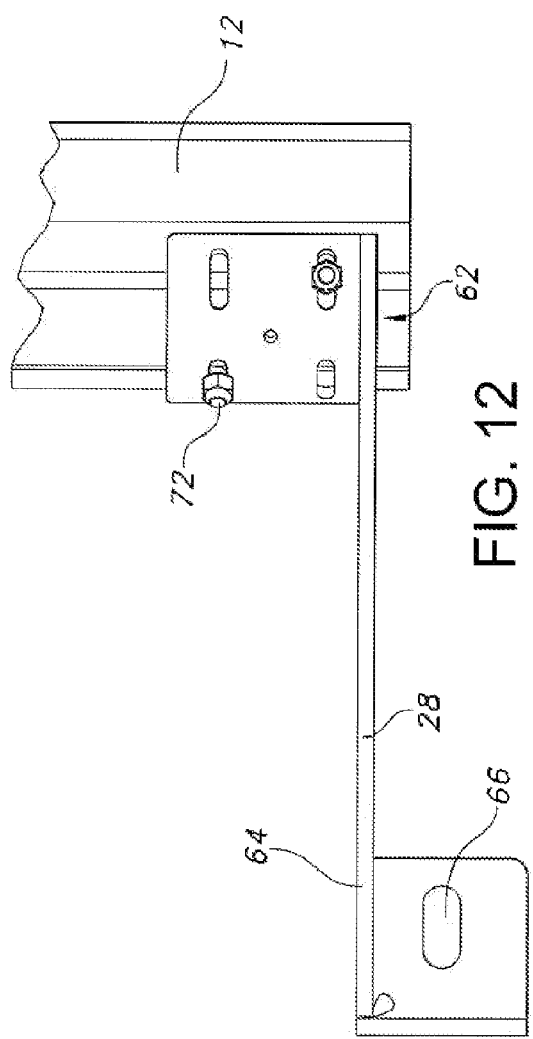
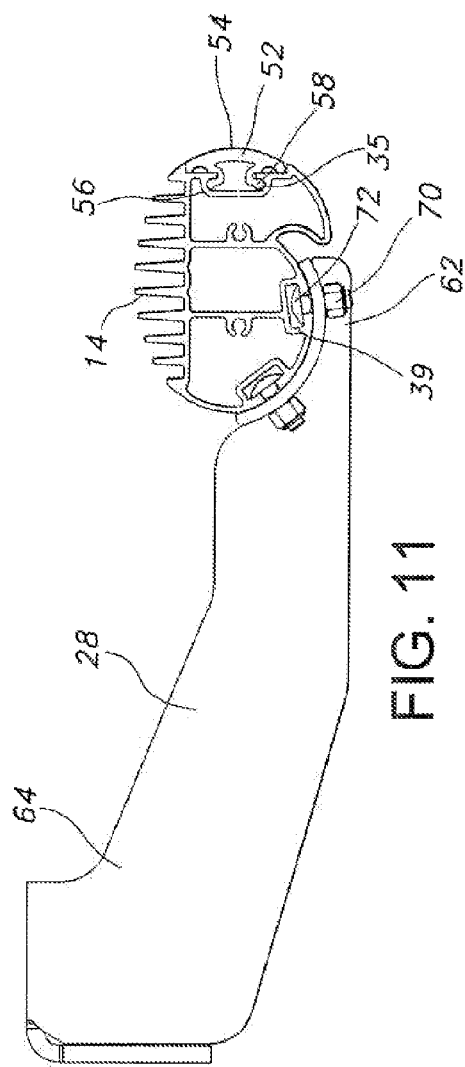

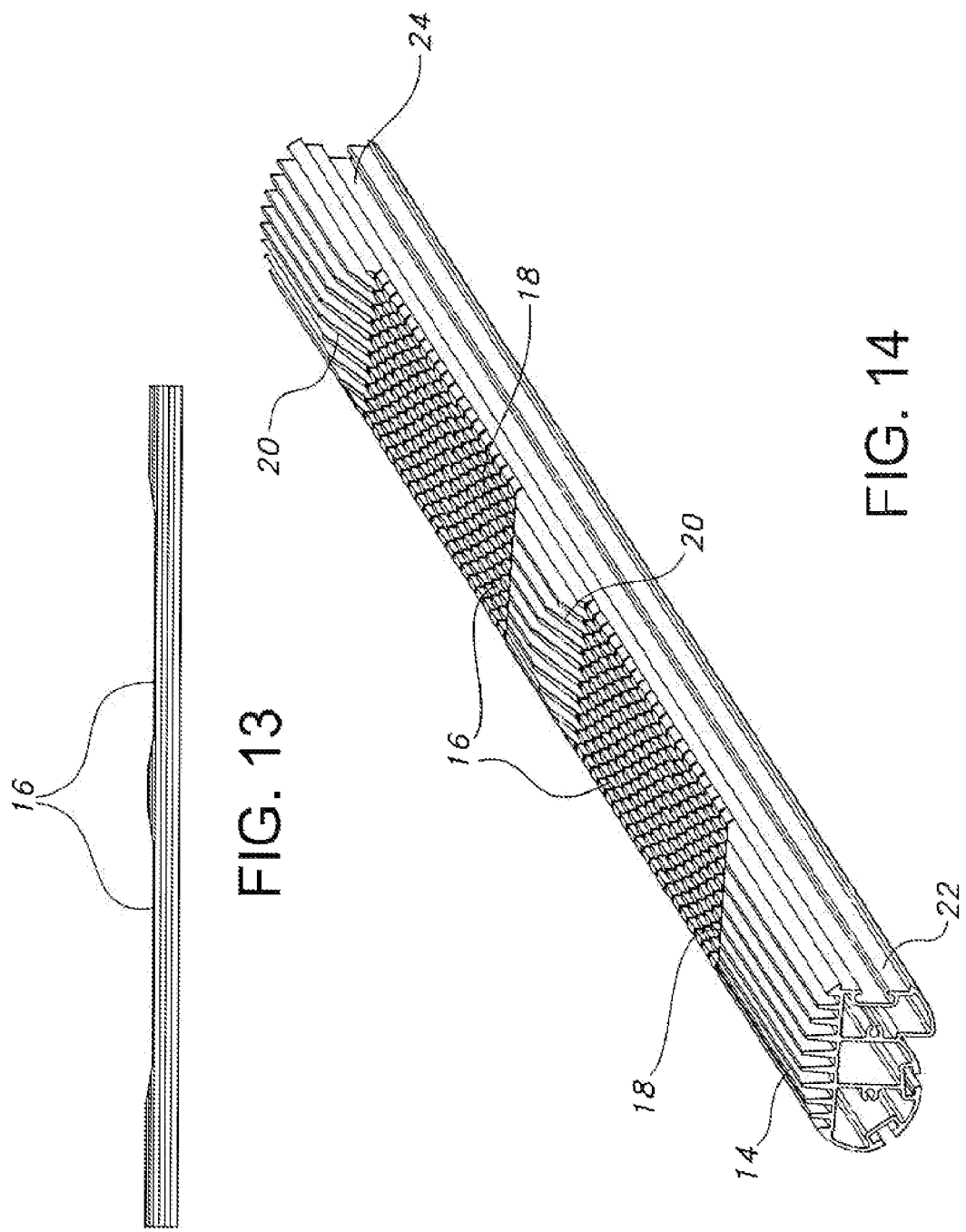

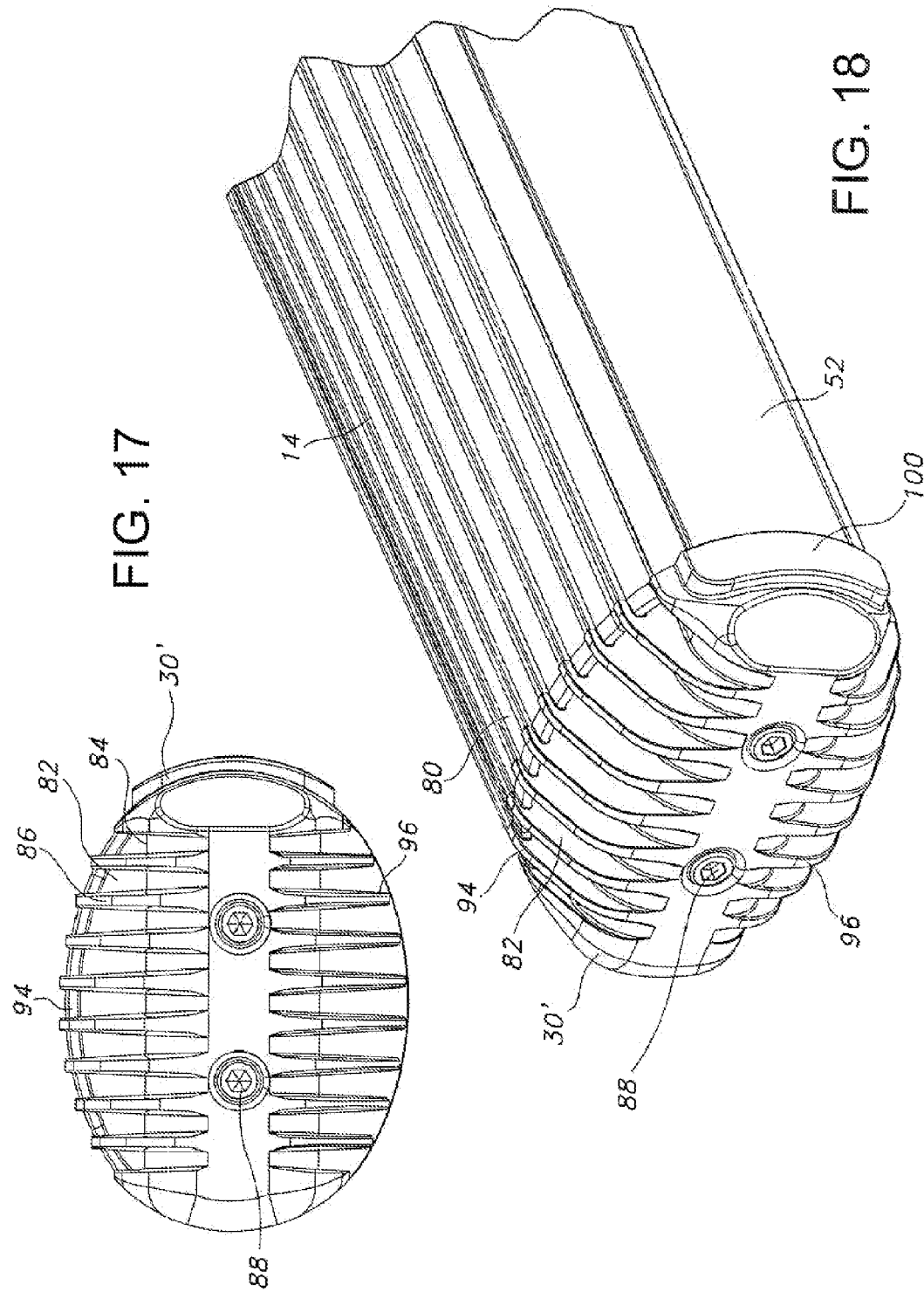

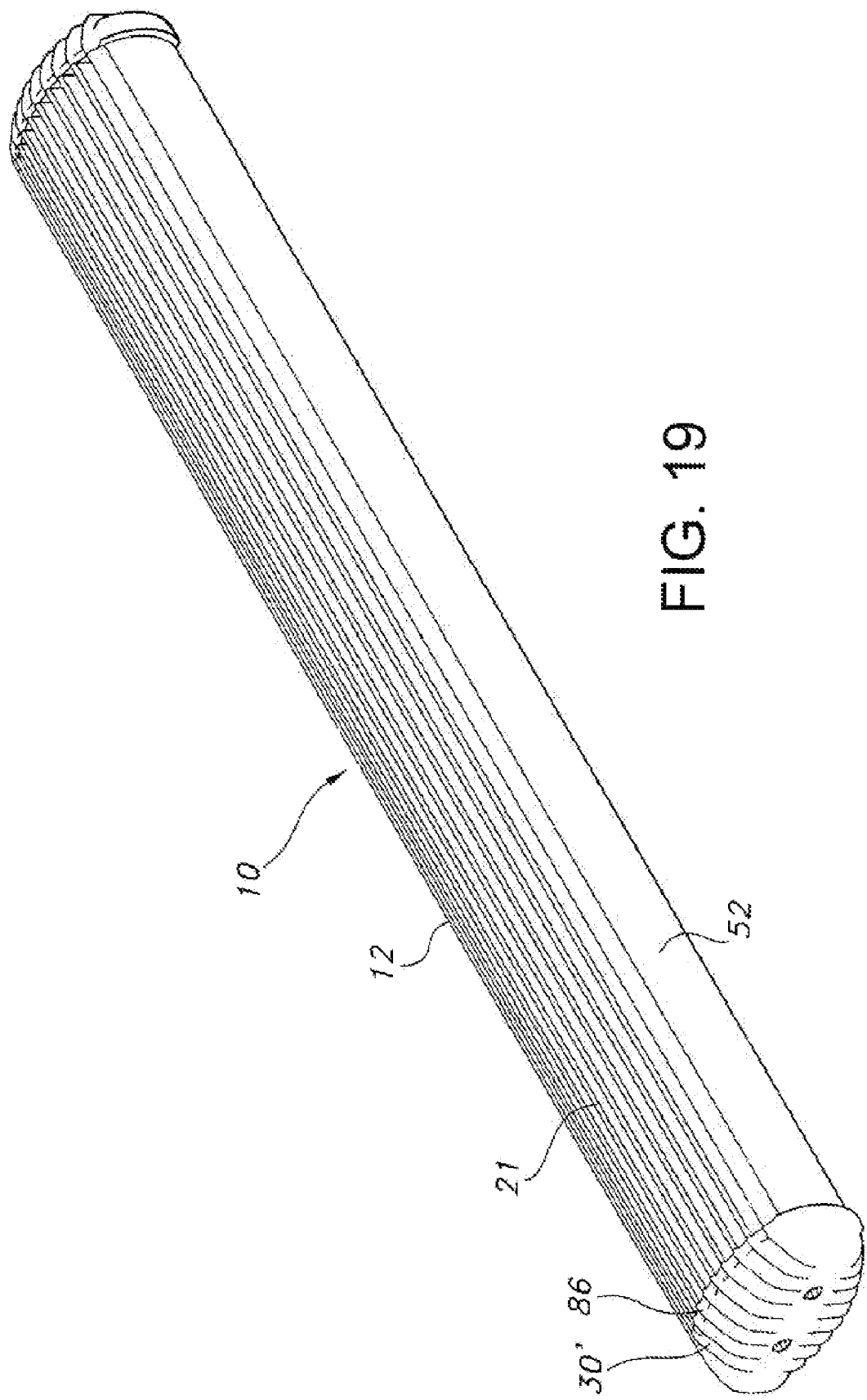

VEHICLE STEP TUBE

This application is a continuation-in-part of U.S. patent application Ser. No. 10/855,265, filed on May 27, 2004 now U.S. Pat. No. 7,168,721.

BACKGROUND OF THE INVENTION

The present invention relates to step tubes for vehicles and to a method for making step tubes.

Step tubes, which are substitutes for running boards, are commonly mounted on vehicles for assisting a user of the vehicle to climb into and out of the vehicle. They are also commonly used for aesthetic reasons, and to protect the side of the vehicle.

Step tubes can be fabricated from aluminum extrusions. An example of such a step tube is disclosed in U.S. Pat. No. 6,588,782 to Coomber. The Coomber step tube includes an elongated support portion 100, multiple cap portions 200, a step pad 300, and a mounting bracket 400. The cap portions 200 and the step portion 300 attach to the support portion 100 to form an upper surface of the assembly that is aesthetically pleasing and functional for assisting vehicle users. The step portion 300 may include a name plate 962, a plurality of perforations 964 to allow passage of light through the step pad 300, and a plurality of ridges 972 to provide traction for users stepping on the step portion 300.

The Coomber step tube requires considerable fabrication and assembly of multiple extruded components. Consequently, manufacture of the Coomber step tube requires significant labor and therefore expense.

SUMMARY OF THE INVENTION

The aforementioned problems are overcome by the present invention, wherein a step tube comprises a one-piece extrusion that includes a plurality of generally vertical ribs on its upper portion. The ribs may vary in height along their longitudinal extent, with the ribs being relatively short in one or more step portions and relatively high in the flanking portions flanking the step portion. The ribs provide traction in the step portion.

In one embodiment, transition portions extend between the step portion and the flanking portions. The height of the ribs gradually transitions from the high height in the flanking portions to the short height in the step portion.

In another embodiment, the ribs in the step portion include transverse cuts to further enhance traction and aesthetics in the step portion. The cuts may be located at spaced intervals throughout the step portion.

In another embodiment, the ribs have a uniform height along the longitudinal length of the extrusion. The ribs are spaced apart to define channels in between the ribs along the longitudinal length of the extrusion.

In yet another embodiment, the step tube may include a pair of end caps attached to the ends of the extrusion and covering the ends of the extrusion. The end caps include a plurality of openings aligned with the channels in the extrusion to allow air and fluid flow through the channels and the openings. The openings may be defined by a plurality of end cap ribs extending from the upper surface of the end caps.

The present invention also includes a method of manufacturing a step tube, comprising the steps of a) extruding an elongated beam having a plurality of vertically extending ribs and b) removing a portion of the ribs in a step portion of the beam to define a step platform. The removing step may be performed by a computer operated machine.

The step tube of the present invention has a simplified unitary construction. The vertically extending ribs minimize wear on the surface of the step tube, and create channels to receive dirt, snow, and ice below the step surface. The step tube can be manufactured more simply and with lower cost than prior step tubes. Therefore, the step tube provides advantages in manufacture and aesthetics without forfeiting function or structure.

These and other objects, advantages, and features of the invention will be more fully understood and appreciated by reference to the description of the current embodiments and the drawings.

BRIEF DESCRIPTION OF THE DRAWINGS

FIG. 7 is a perspective view of a second embodiment of the extrusion at section II of FIG. 1.

FIG. 11 is a cross sectional view of the step tube attached to a bracket.

FIG. 12 is a bottom view of a mounting bracket attached to the extrusion.

FIG. 13 is a side view of an alternative embodiment.

FIG. 14 is a perspective view of the alternative embodiment of FIG. 13.

FIG. 17 is an end view of the FIG. 15 embodiment.

FIG. 18 is a close up perspective view of the extrusion and an end cap according to the FIG. 15 embodiment.

FIG. 19 is a perspective view of the extrusion including end caps according to another alternative embodiment.

DESCRIPTION OF THE CURRENT EMBODIMENTS

Figure 1:
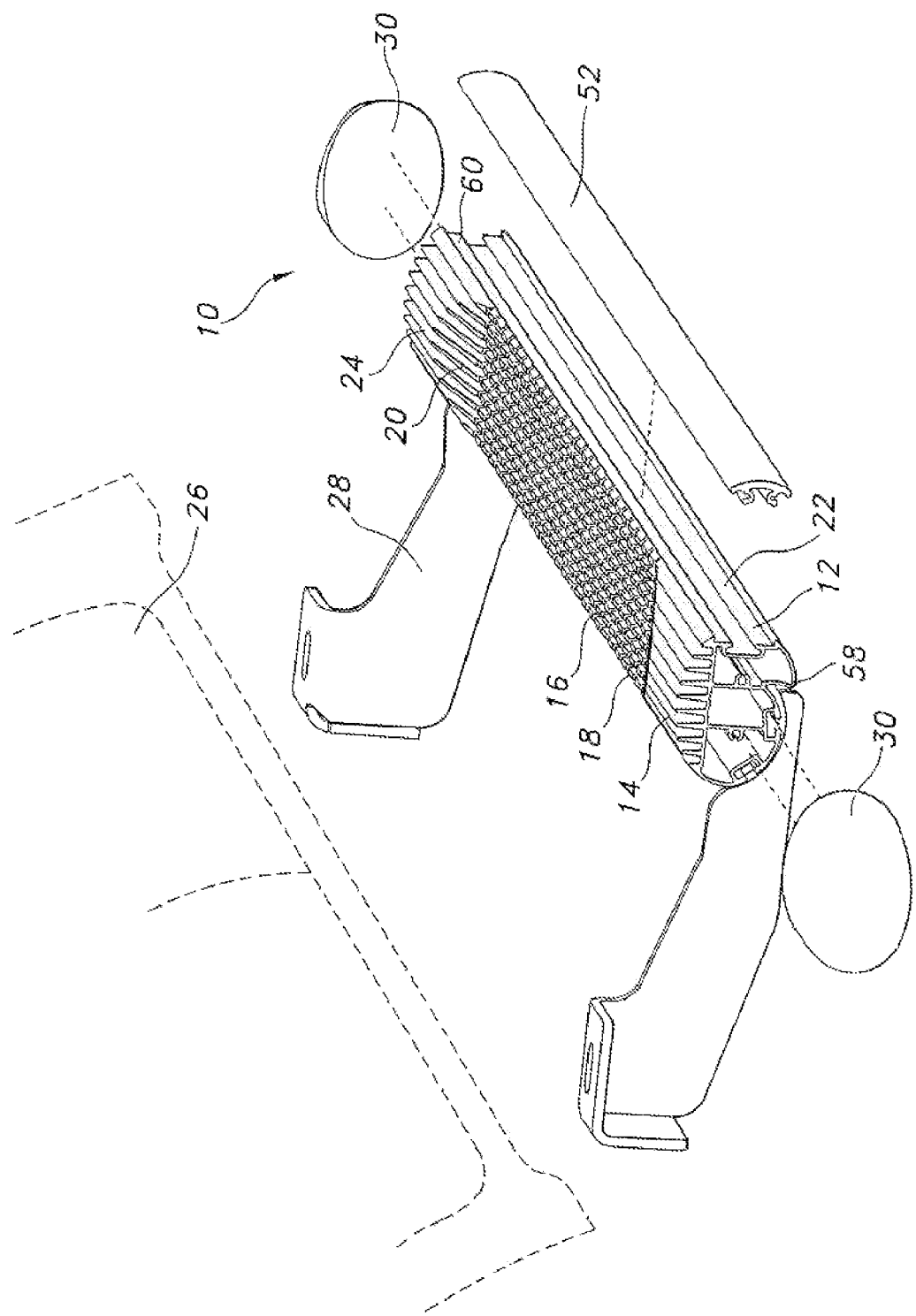
FIG. 1 is an exploded view of the step tube and a vehicle body.
Figure 2:
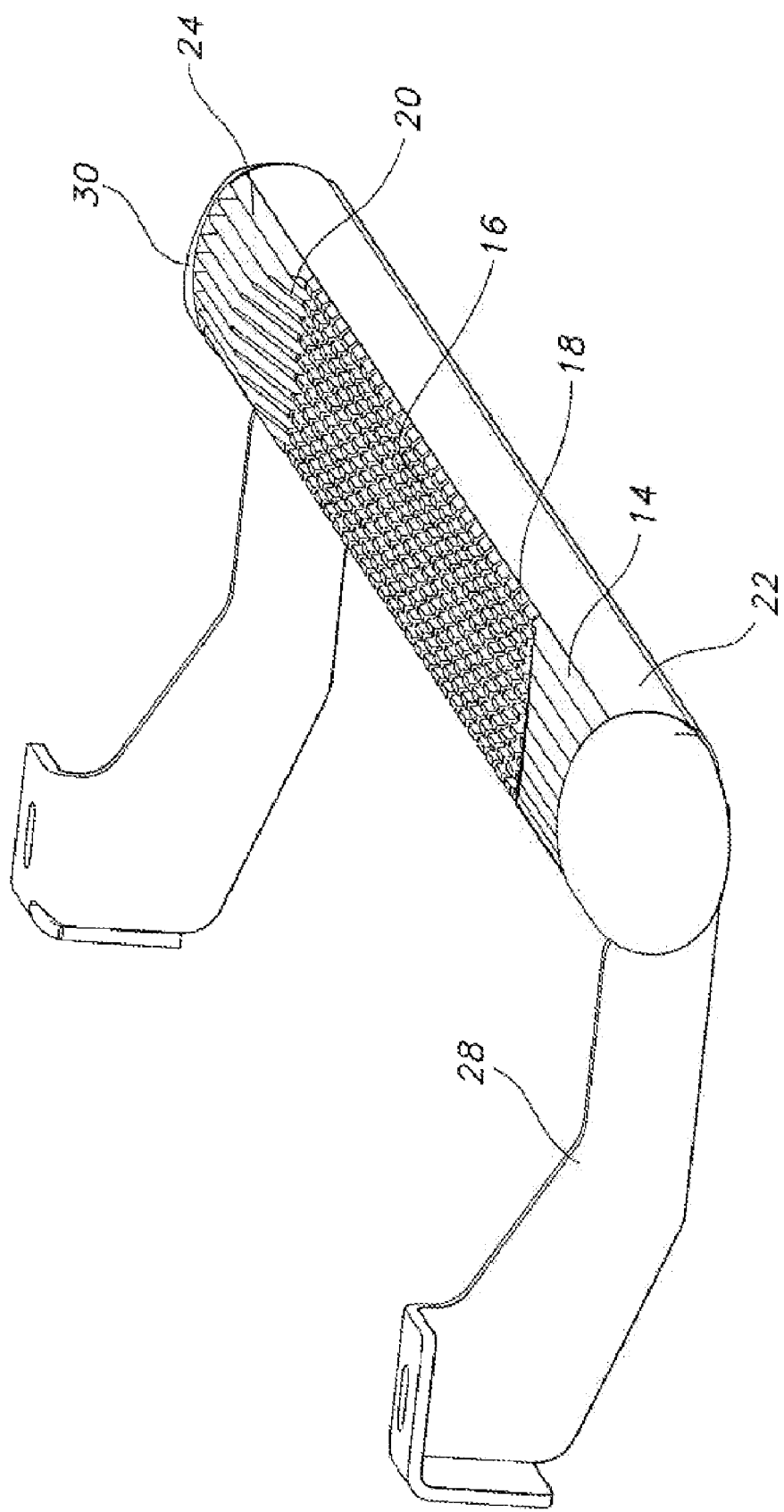
FIG. 2 is a perspective view of the step tube.

A step tube constructed in accordance with a preferred embodiment of the present invention is shown in FIGS. 1 and 2 and generally designated 10. The step tube 10 generally includes an elongated extrusion 12, having a plurality of generally vertical ribs 14. The extrusion further includes a step portion 16, transition portions 18, 20 flanking the step portion 16, and flanking portions 22, 24. The step tube is attached to a vehicle 26 with a plurality of mounting brackets 28, and may include a pair of end caps 30.

Figure 3:
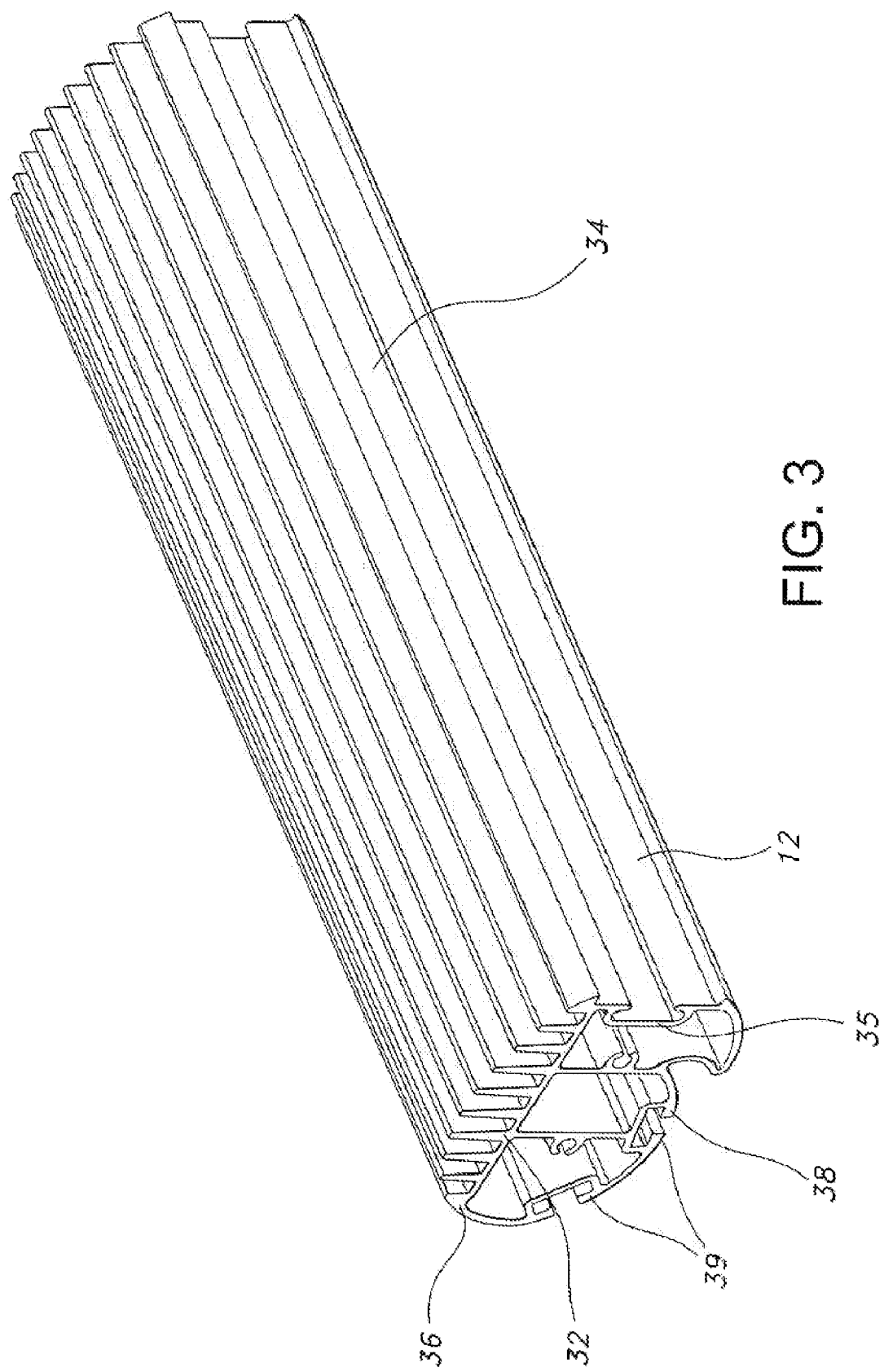
FIG. 3 is a perspective view of the step tube extrusion at section II in FIG. 1.

As shown in FIG. 3, the extrusion 12 is an elongated beam. The extrusion may be comprised of aluminum, a similar alloy, a thermoplastic, or any other suitable material. As the beam 12 is extruded, it is cut to a desired length, depending on the vehicle that it will be attached to. As shown in FIGS. 1 and 2, the beam 12 includes a step portion 16, transition portions 18, 20 on either side of the step portion 16, and opposing flanking portions 22, 24 adjacent to the transition portions 18, 20. Referring to FIG. 3, the beam 12 further includes an upper surface 32, a front surface 34, a rear surface 36, and a lower surface 38. The front surface 34 preferably includes a C-shaped slot 35 for receiving a trim piece 52 (shown in FIG. 11). The lower 38 and rear 36 surfaces preferably each include a T-shaped slot 39 for receiving attachment brackets 28.

Figure 4:
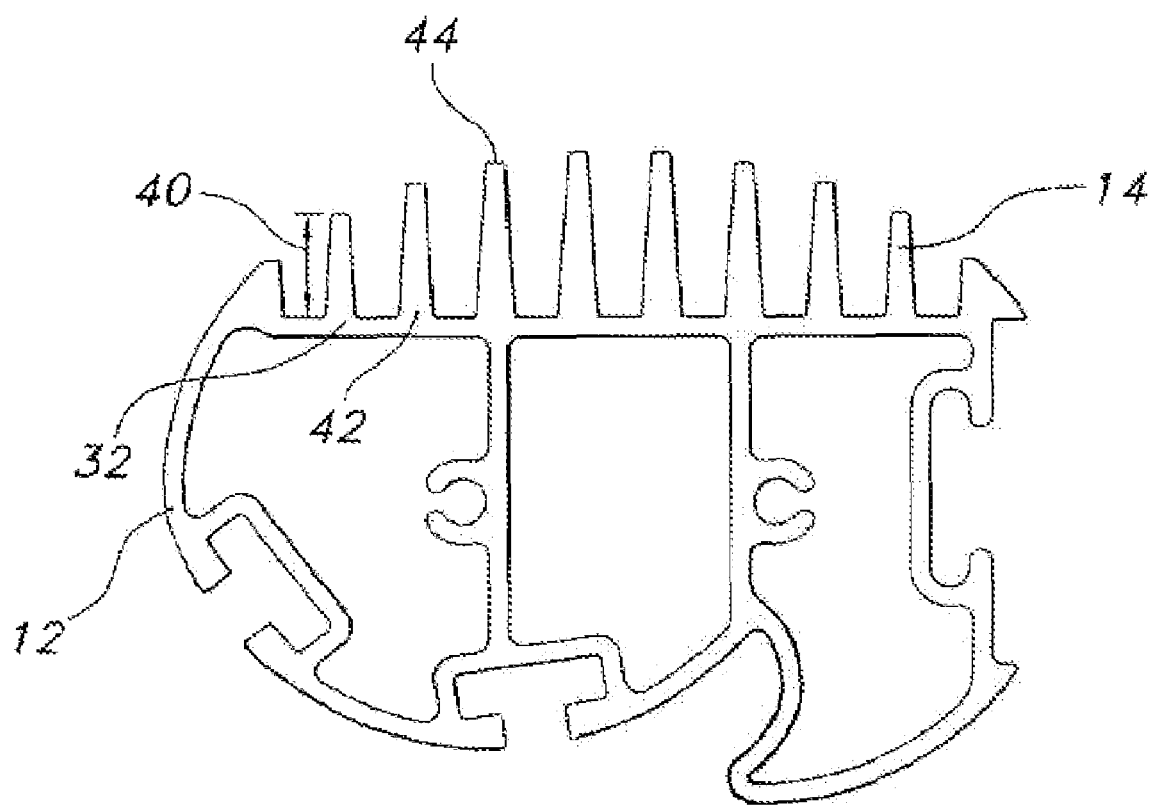
FIG. 4 is an end view of the extrusion of FIG. 2.

Referring now to FIG. 4, the plurality of ribs 14 extend vertically from the upper surface 32 of the extrusion 12. The ribs 14 are preferably spaced apart, and each rib has a height 40, a base 42, and an outer edge 44. As shown, the height 40 of the ribs 14 may decrease in each sequential rib 14 as the ribs 14 approach the front and rear surfaces 34, 36. Alternatively, the ribs 14 may have a uniform height 40.

Figure 5:
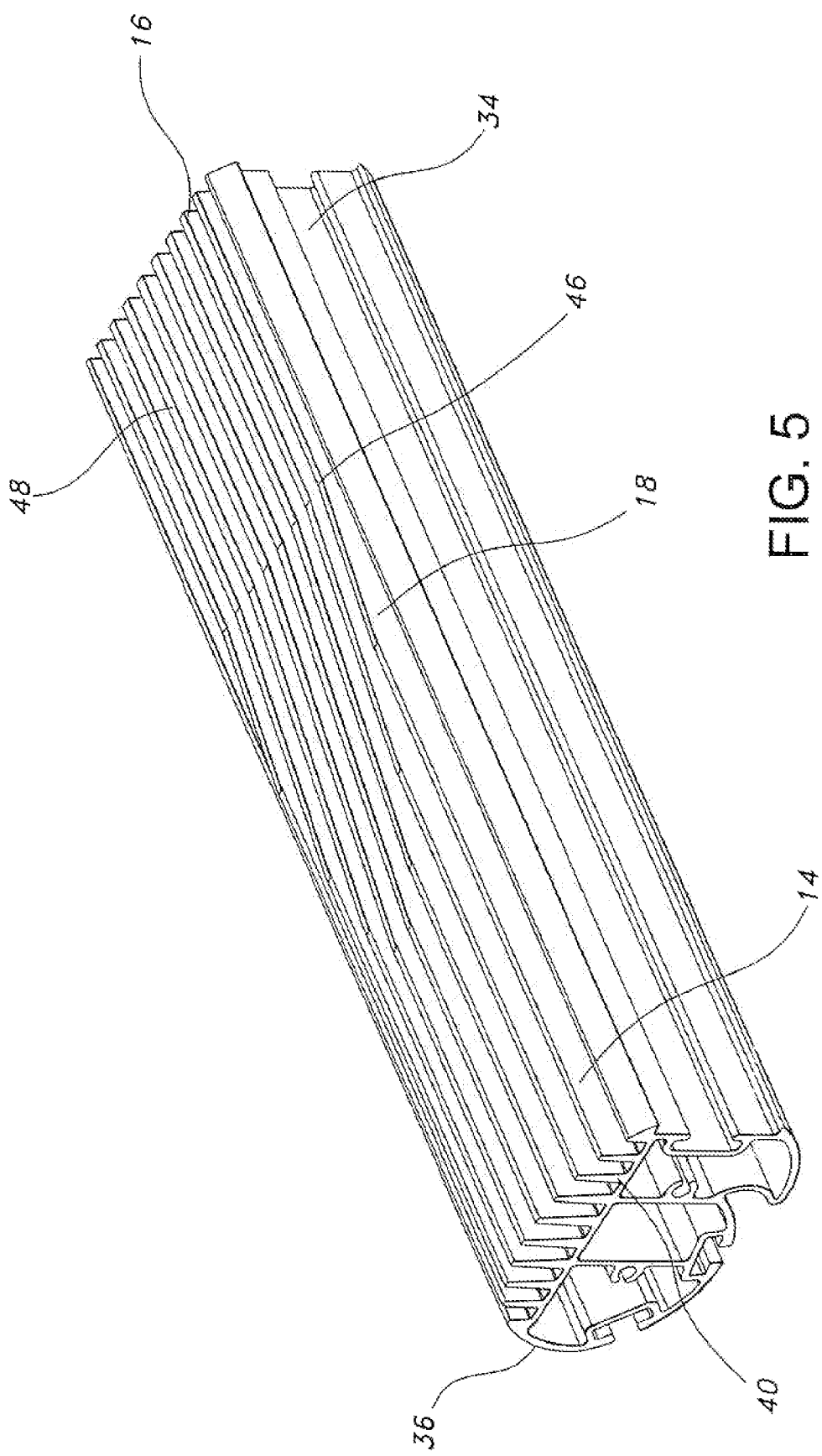
FIG. 5 is a perspective view of the extrusion at section II in FIG. 1, including a first cut.
Figure 5A:
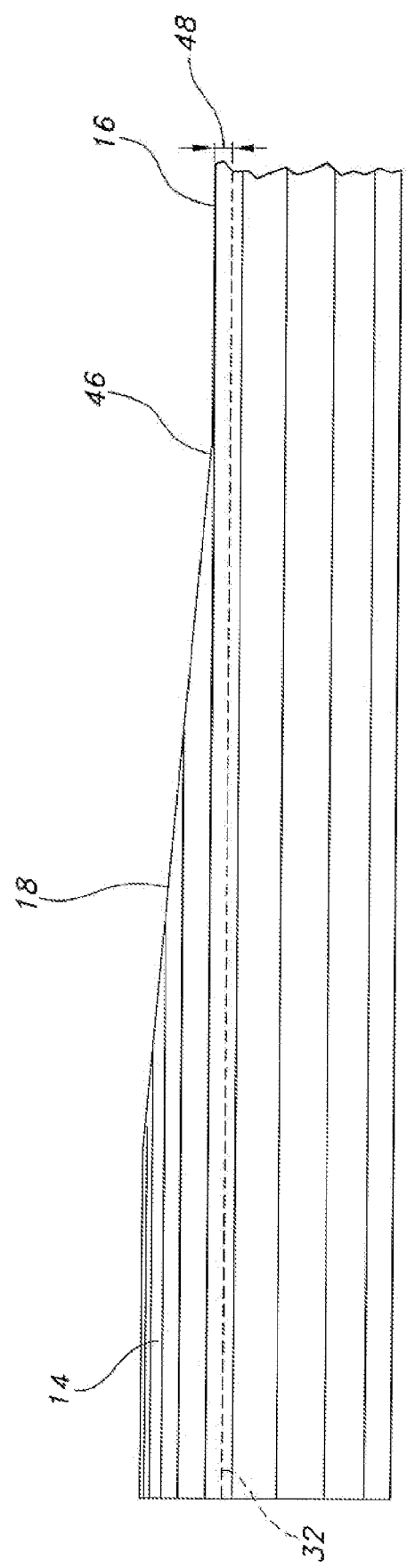
FIG. 5A is a side view of the extrusion of FIG. 5.

As shown in FIGS. 5 and 5A, the ribs 14 include a first cut 46 defining the step portion 16. In the illustrated embodiment, the step portion 16 is located in a central section of the extrusion 12 (see FIGS. 1 and 2). The first cut 46 is a cut that shaves off a portion of the height 40 of the ribs 14 such that the ribs 14 have a second height 48 in the step portion 16. In one embodiment, the first cut 46 is a machined cut. The second height 48 is preferably uniform from the front surface 34 to the rear surface 36 to form a level step platform. In one embodiment, the height 40 of the ribs 14 gradually tapers to the second height 48 within the transition portions 18, 20. Alternatively, the transition portions 18, 20 may have a variety of desired shapes.

Figure 6:
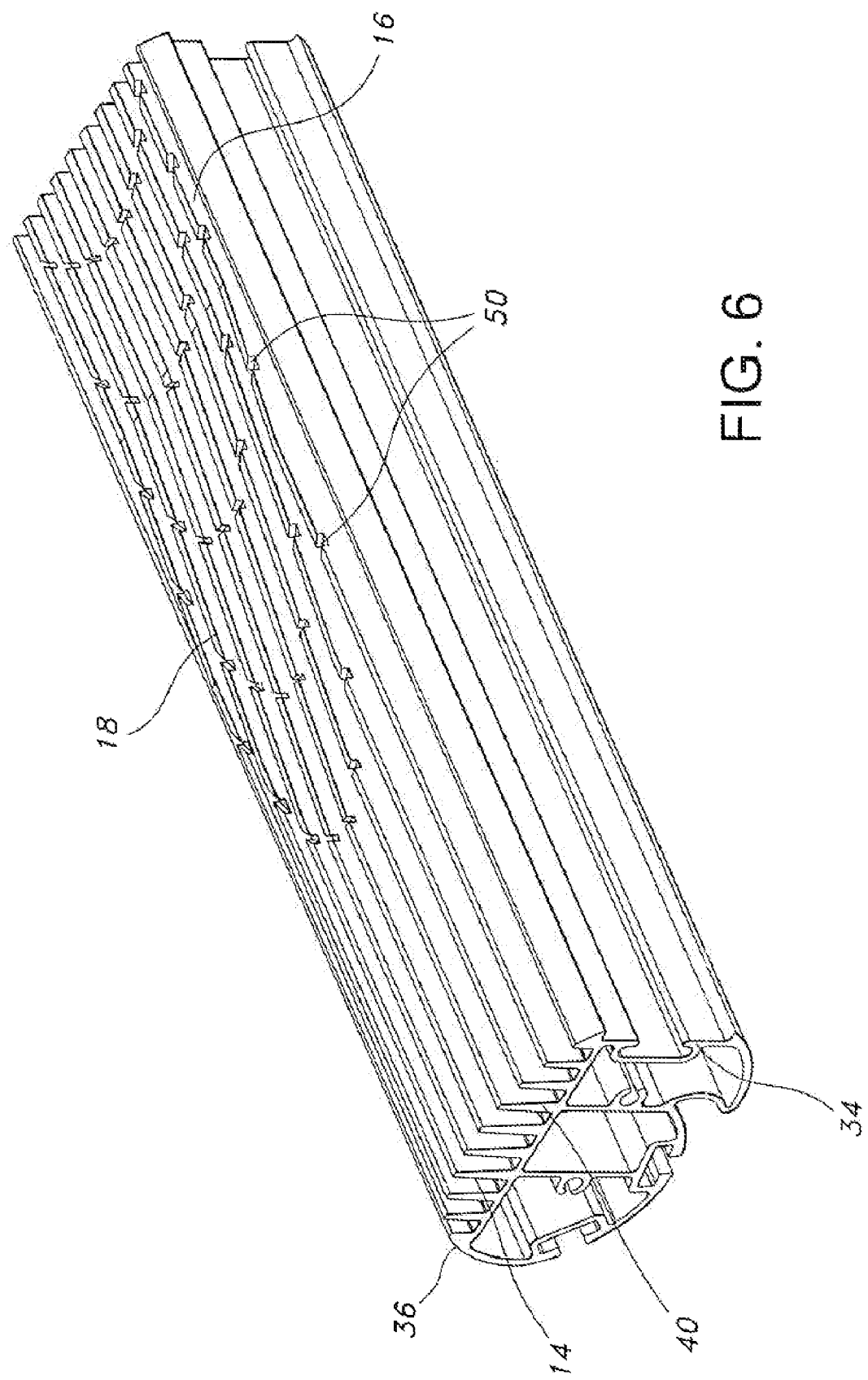
FIG. 6 is a perspective view of the extrusion of FIG. 5, also including a second cut.
Figure 6A:
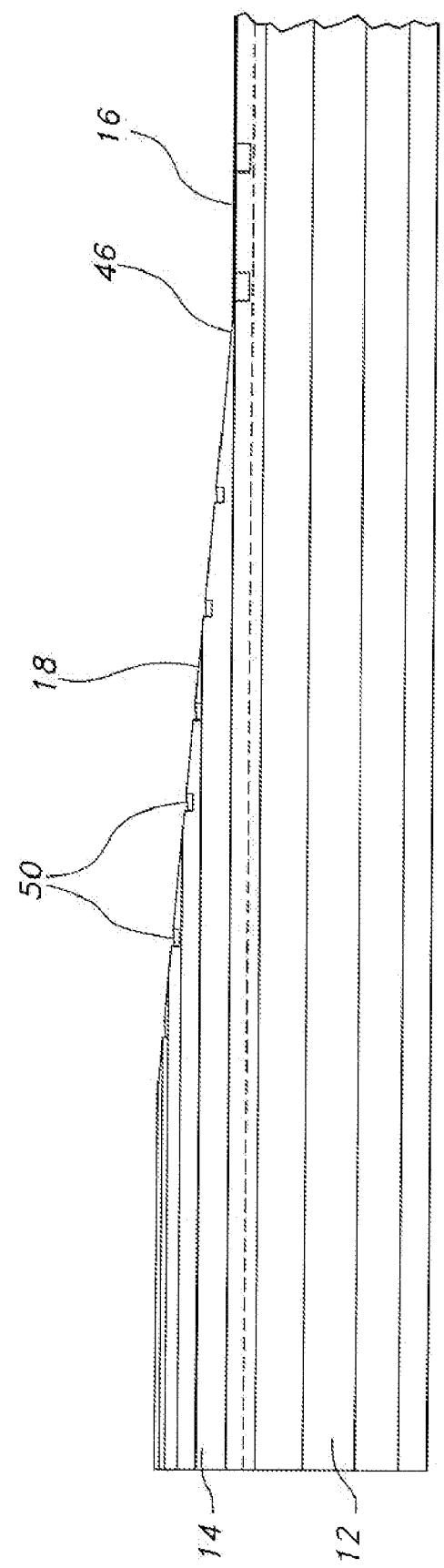
FIG. 6A is a side view of the extrusion of FIG. 6.

As shown in FIGS. 6 and 6A, the ribs 14 also may include a second cut or plurality of cuts 50. The second cuts 50 preferably extend transversely through the ribs 14 across the extrusion from the front surface 34 to the rear surface 36. The second cuts 50 are preferably spaced apart in a series of cuts throughout the step portion 16 and the transition portions 18, 20. As shown in FIG. 6, the series of second cuts 50 may have a parabolic shape as they extend transversely across the extrusion 12. Alternatively, the second cuts 50 may have a variety of desired shapes and patterns. They may be straight cuts that are perpendicular to the first cuts, and they may even have the formation of a logo.

Referring to FIGS. 1 and 11, the step tube may include a trim piece 52 and a pair of end caps 30. The trim piece 52 is a separate decorative part that may also be extruded from aluminum, a similar alloy, a thermoplastic, or other suitable material. It also acts as a bumper to protect the step tube 10. The trim piece 52 has a front surface 54 that is shaped to correspond with the shape of the front surface 34 of the extrusion 12, and a rear surface 56 that includes a T-shaped protrusion 58 that may be slidably coupled with the C-shaped slot 35. The end caps 30 are adapted to engage the open ends 58, 60 of the extrusion, and are shaped to close off the ends. The end caps 30 may include a plurality of vertically extending extrusions to correspond with the ribs 14.

The step tube 10 may be attached to a vehicle body by a variety of conventional methods. FIG. 11 shows one such method, wherein at least one mounting bracket 28 is attached at a first end 62 to the step tube 10 and at a second end 64 to a vehicle body 26. The first end 62 attaches to the T-shaped slots 39, with a nut 70 and bolt 72, or with a T-shaped protrusion (not shown) that may be slidably engaged with the slots 39. The second end 64 preferably attaches to the vehicle 26 through slot 66 with a nut and bolt (not shown).

Figure 8:
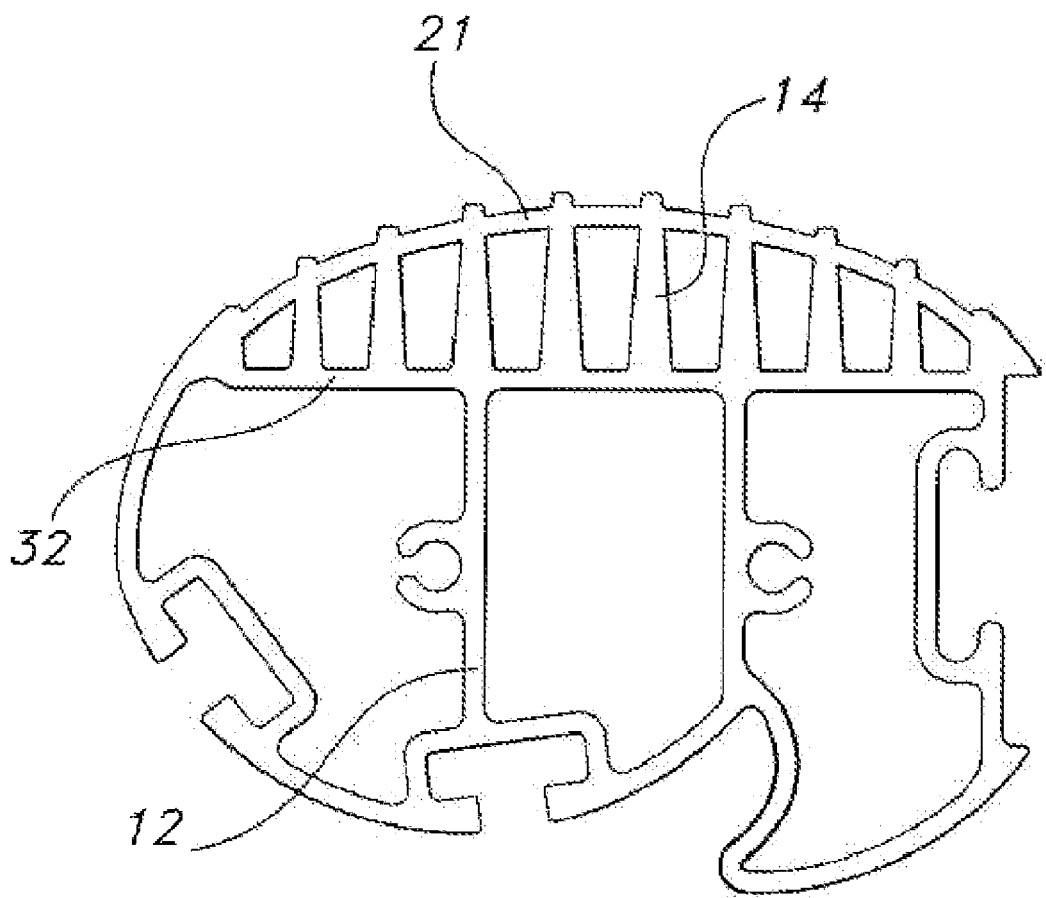
FIG. 8 is an end view of the extrusion of FIG. 7.
Figure 9:
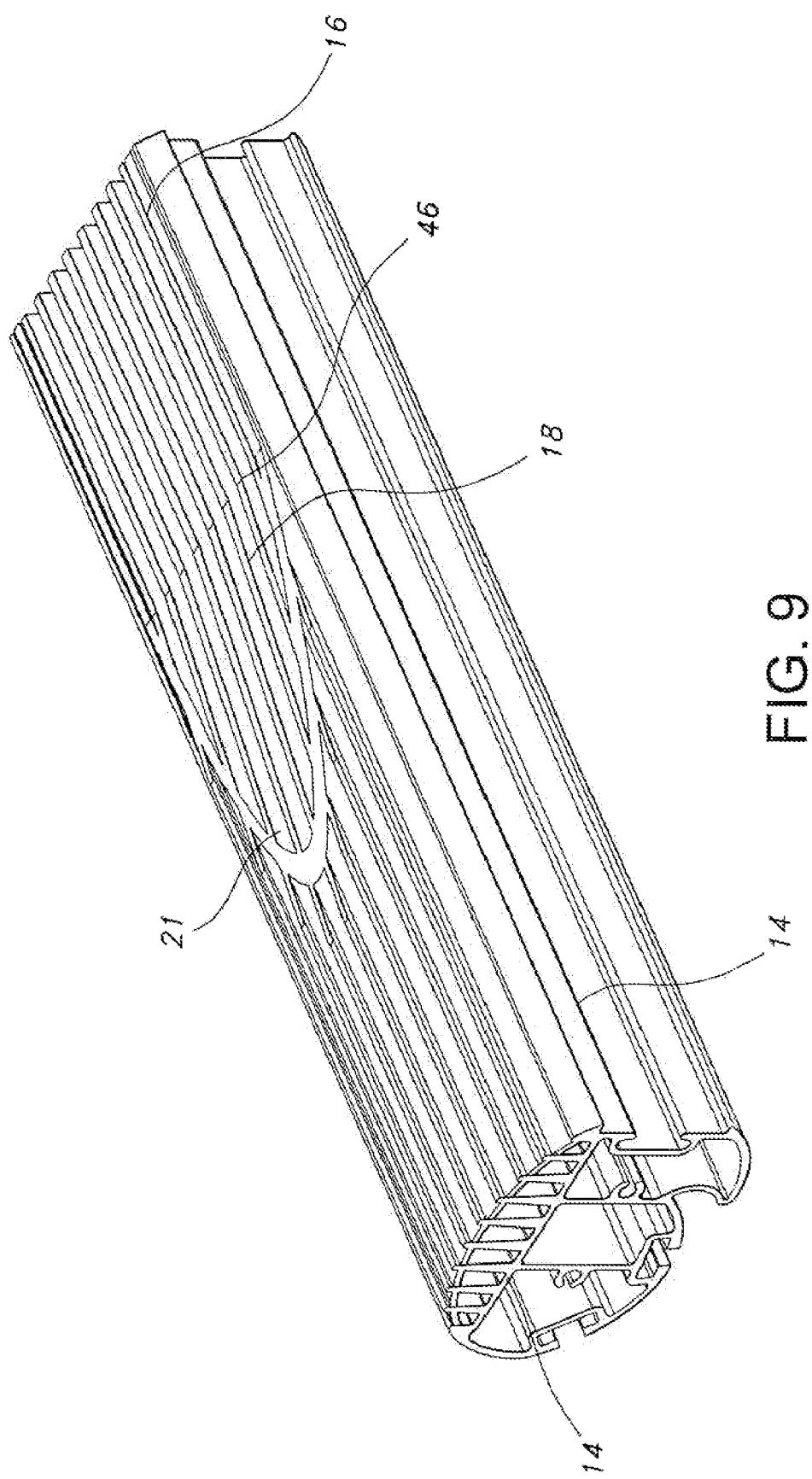
FIG. 9 is a perspective view of the second embodiment of the extrusion at section II in FIG. 1, including a first cut.
Figure 9A:
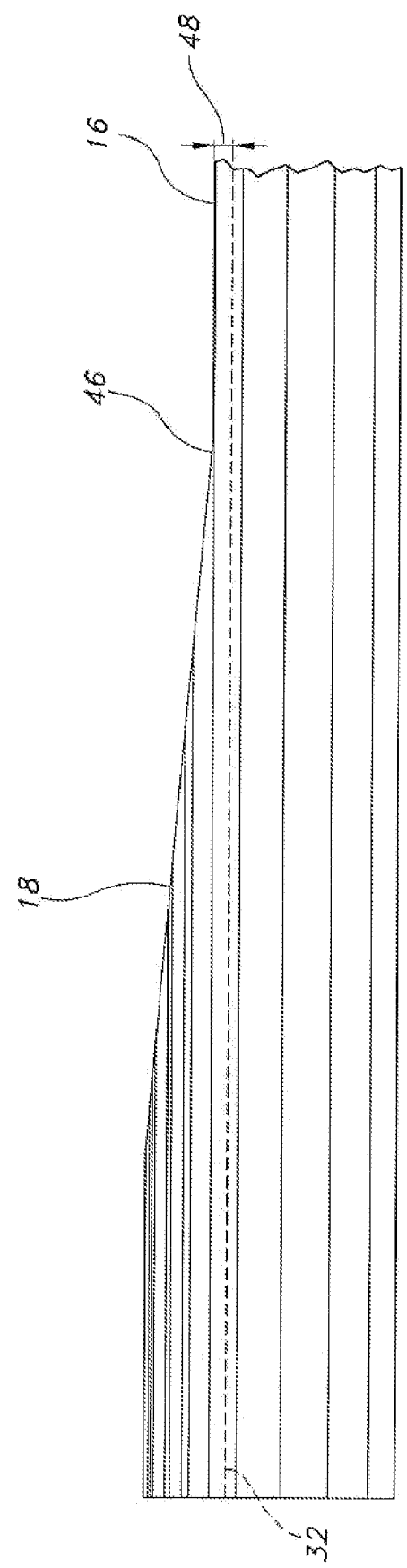
FIG. 9A is a side view of the extrusion of FIG. 9.
Figure 10:
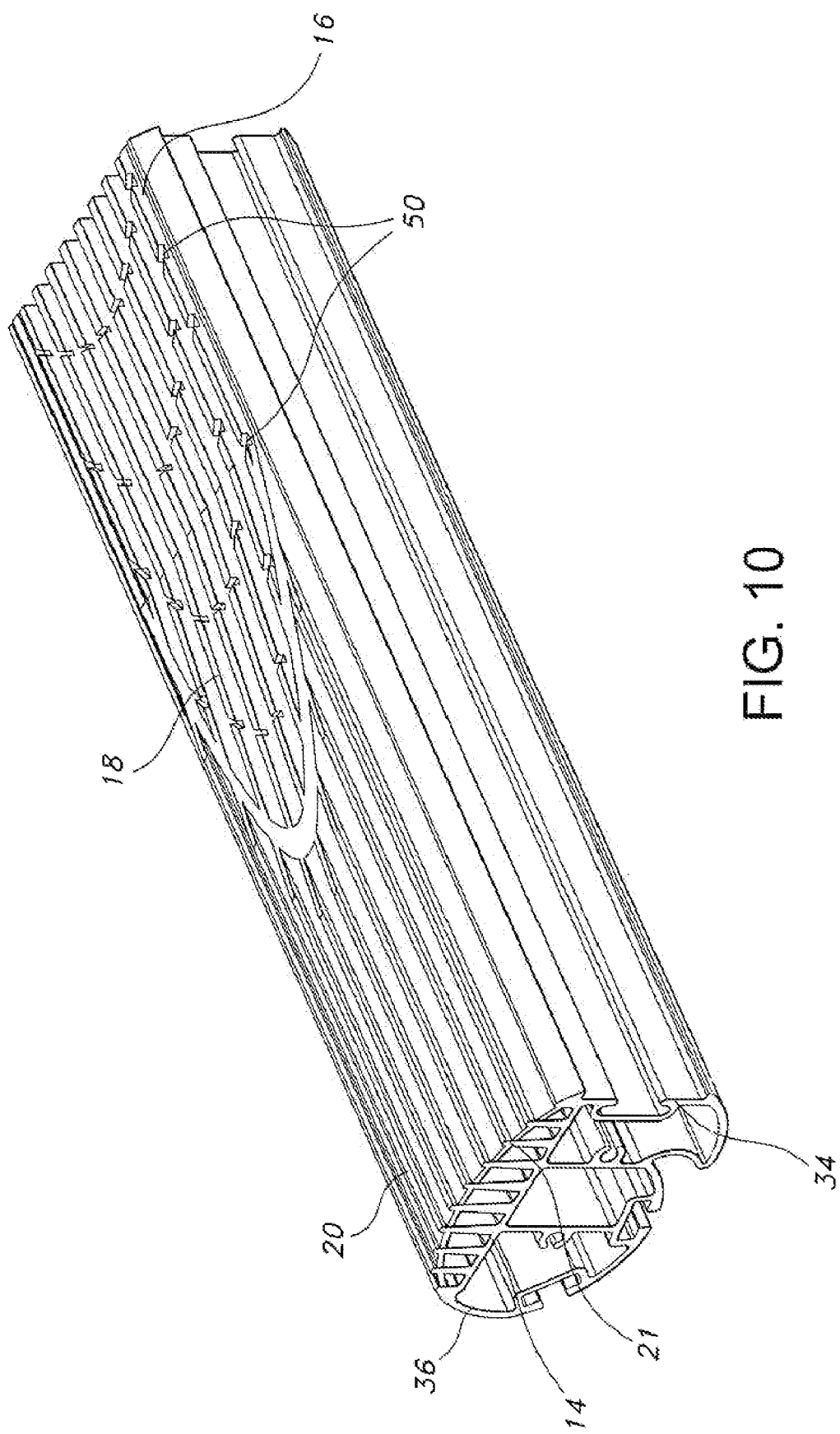
FIG. 10 is a perspective view of the extrusion of FIG. 9, also including a second cut.
Figure 10A:
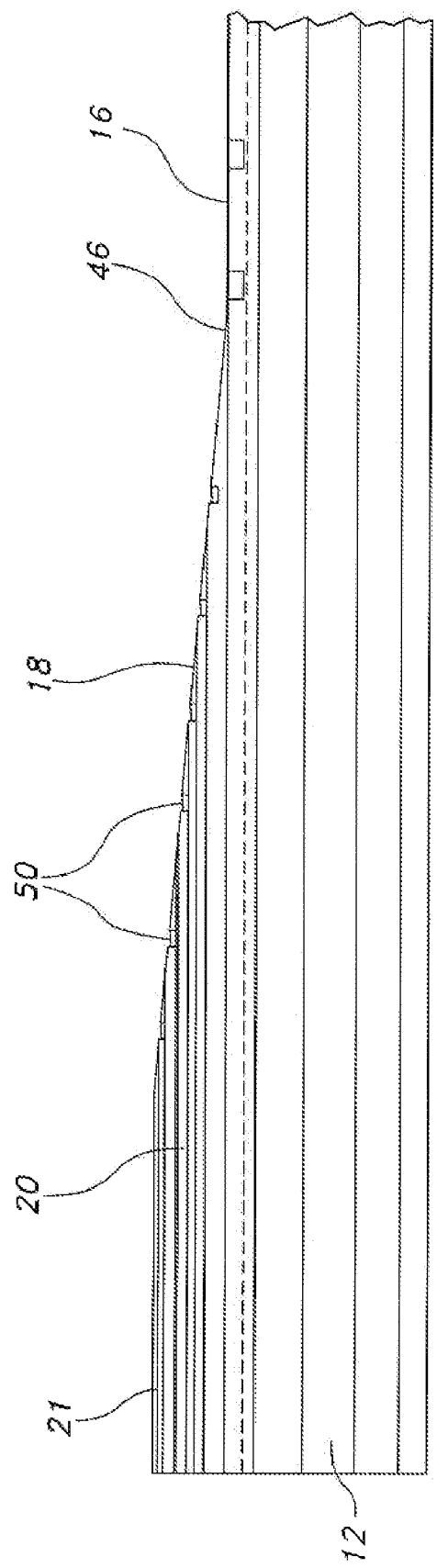
FIG. 10A is a side view of the extrusion of FIG. 10.
Figure 15:
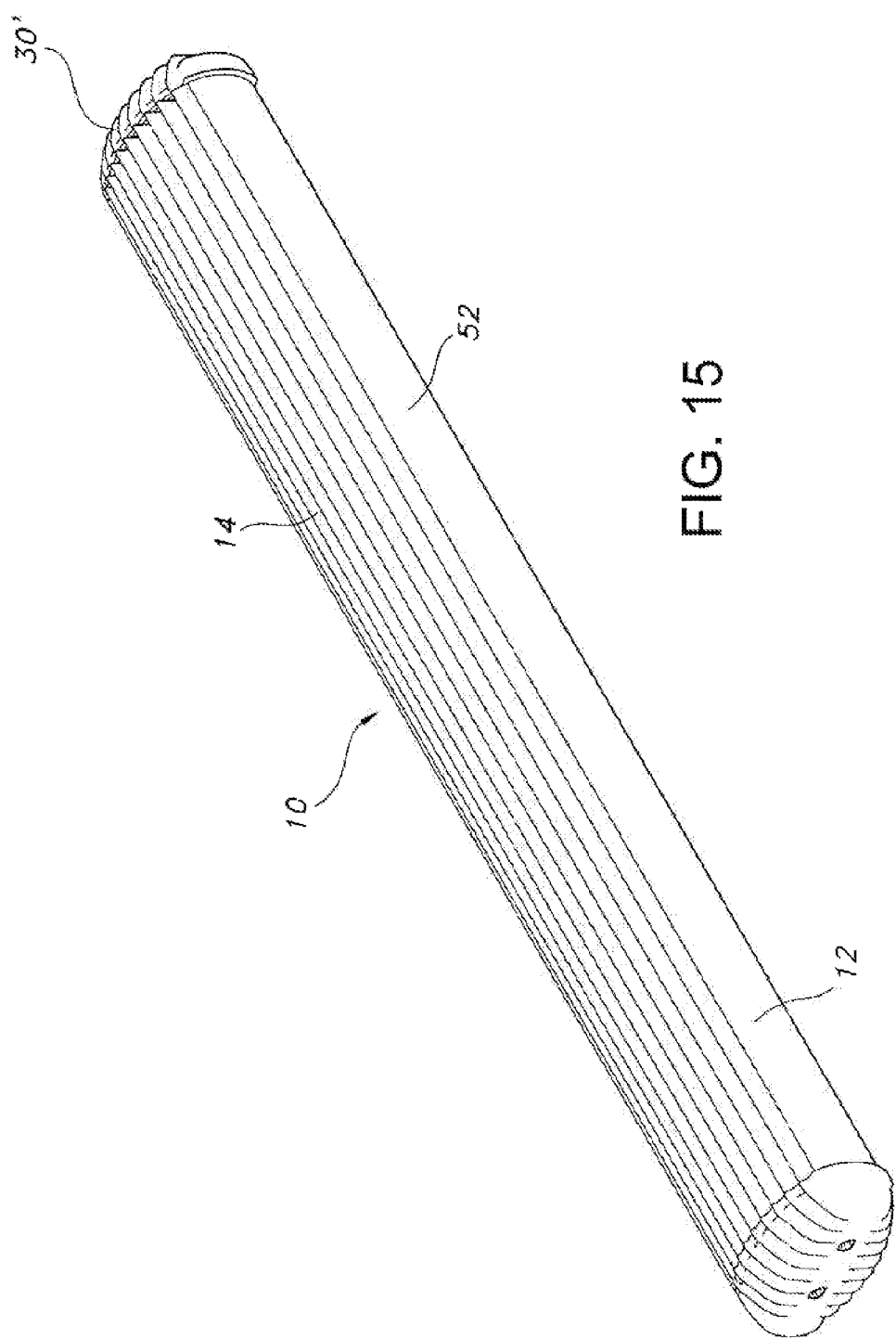
FIG. 15 is a perspective view of the extrusion including end caps according to another alternative embodiment.
Figure 16:
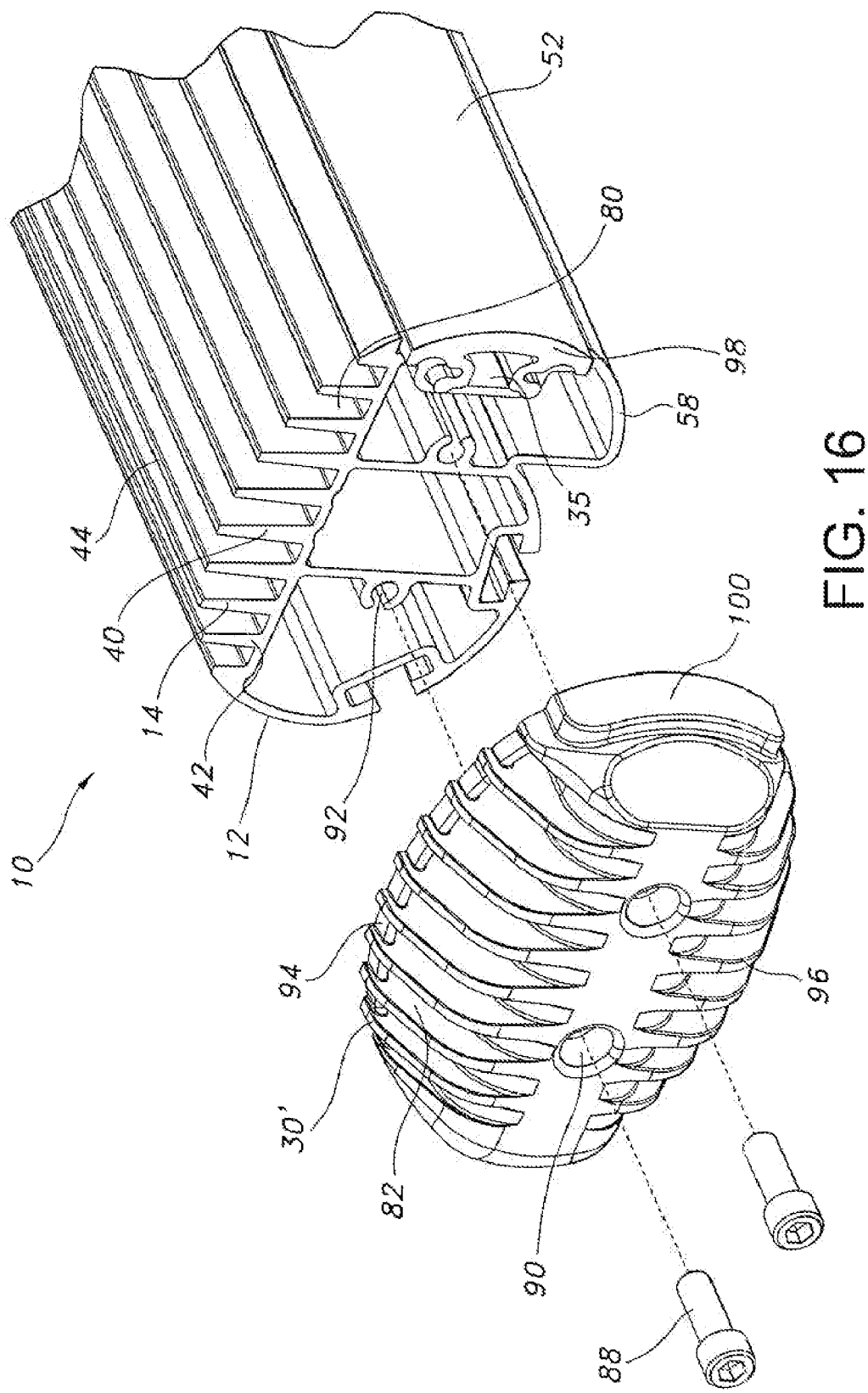
FIG. 16 is an exploded view of the extrusion and an end cap according to the FIG. 15 embodiment.

FIGS. 7-10 show a second embodiment of the present invention, wherein the extrusion 12 includes a web 21 that attaches between the outer edges 44 of the ribs 14, and encloses the ribs 14. As shown in FIG. 8, the profile of the extrusion 12 is the same as the first embodiment, but further including the web 21. FIGS. 9 and 9A show the extrusion 12 with the web 21, further including a first cut 46. The cut 46 is identical to the first cut 46 of the first embodiment, however, in this embodiment, the first cut 46 removes a portion of the web 21 along with portions of the ribs 14. The transition portions 18, 20 and the step portion 16 are the same as in the first embodiment. FIG. 10 additionally shows the second cut 15 as a series of cuts identical to those of the first embodiment. The end portions 22, 24 continue to include the web 21 after the cuts 46, 50 have been made.

Another embodiment of the invention is shown in FIGS. 13 and 14. In this embodiment, the step tube includes a plurality of step portions 16. As shown in FIGS. 13 and 14, there are two step portions 16. The step portions 16 generally include first and second cuts similar to that disclose above. As shown, the second cuts 50 are perpendicular to the first cuts 46. The cuts of each step portion 16 may vary in height and design. In general, the multiple step portions coincide in location with front and rear doors of the vehicle and possibly a cargo bed. Of course, this embodiment may also include the web 21 of the second disclosed embodiment.

In yet another embodiment, shown in FIGS. 15-20, the step tube 10 does not include the first cut 46 or the second cut 50. In this embodiment, the ribs 14 have a uniform height. As shown, the ribs 14 have a uniform height 40 along the entire longitudinal length of the extrusion. The ribs 14 therefore define channels 80 that extend along the length of the extrusion in between the ribs 14. The outer edges 44 of the ribs 14 form a surface for use as a step platform along the length of the extrusion. The thickness of the ribs 14 may taper to a point from the base 42 to the outer edge 44 in order to guide fluids away from the surface.

Figure 20:
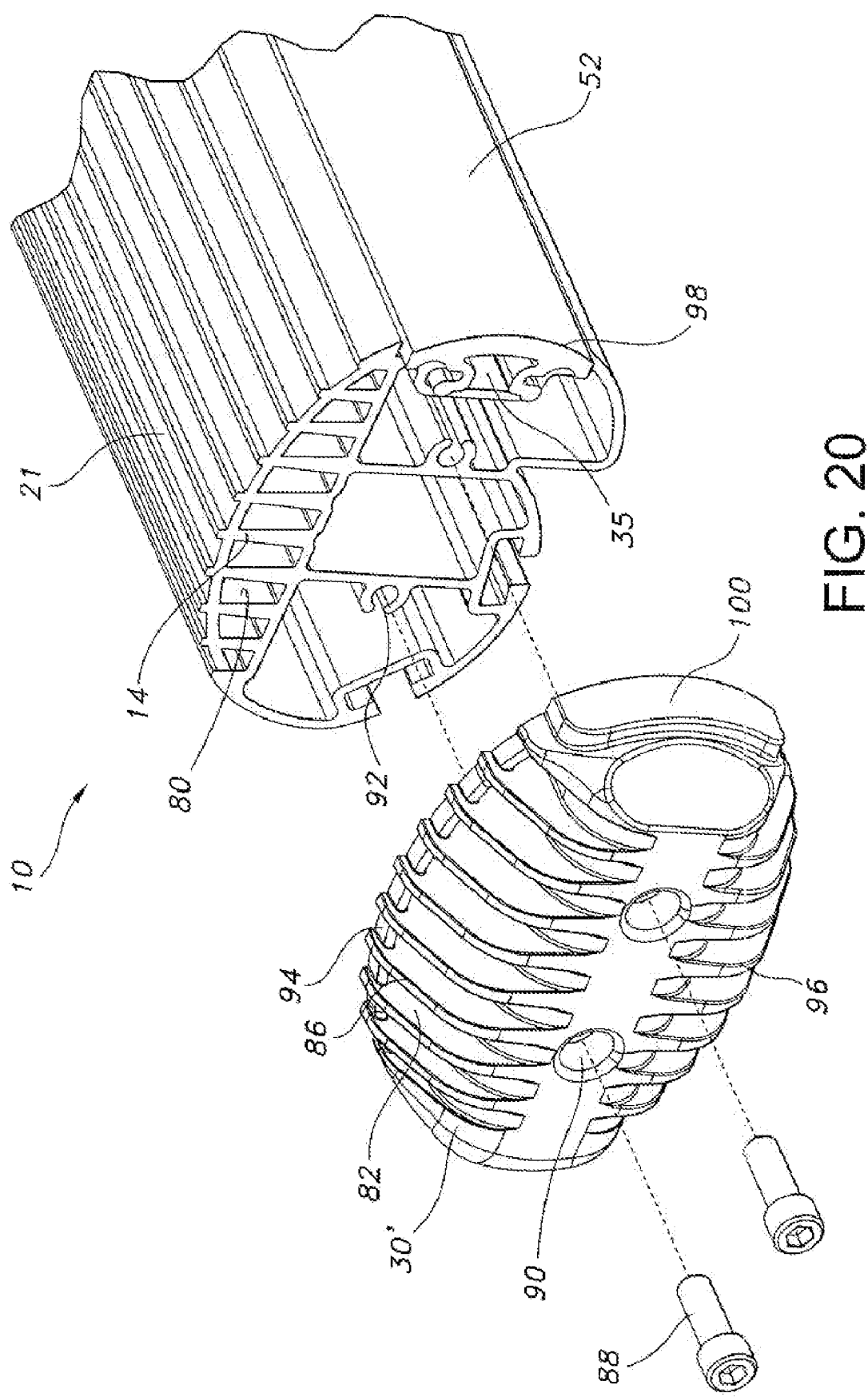
FIG. 20 is an exploded view of the extrusion and an end cap according to the FIG. 19 embodiment.

Also in this embodiment, the step tube 10 may include alternative end caps 30'. The end caps 30' are similar to the end caps 30, described above, in that they are adapted to engage the open ends 58, 60 of the extrusion, and are shaped to close off the ends 58, 60. In this embodiment, however, the end caps 30' include a plurality of openings 82 that are aligned with the channels 80 in the extrusion to allow fluids to flow through the channels 80 and the openings 82 and into an environment (i.e. out of the step tube). As shown, the end caps 30' include an upper surface 84, and a plurality of end cap ribs 86 extending upward from the upper surface 84. The end cap ribs 86 may be joined together by a web 94. The end cap ribs 86 align with the ribs 14 on the extrusion, so the openings 82 can align with the channels 80. As illustrated, a plurality of ribs 96 are included on a lower portion of the ends caps 30'. These ribs 96 are generally for strength and aesthetics and do not require, nor typically include, openings between them. Additionally, the end caps 30' may include an opening 100 shaped to receive an end 98 of the trim piece 52. The opening 100 acts to retain the trim piece 52 in the C-shaped slot 35. The end caps 30' may attach to the extrusion in a variety of conventional ways, including the fasteners 88 extending through holes 90 in the end caps 30' and into receptacles 92 in the extrusion. FIGS. 19 and 20 show a variation of the FIG. 15 embodiment, wherein the extrusion includes a web 21 as described above. The end caps 30' attach to this extrusion in the same conventional manner.

Manufacture of the present invention requires one or more of the steps of a) extruding an elongated beam having a plurality of vertically extending ribs; b) cutting down the height of the ribs in a step portion of the beam to define a step platform; and c) attaching the beam to a vehicle body. The beam may be extruded such that it has the profile shown in FIG. 4, or alternatively the profile of FIG. 8. Step b) preferably includes the first cut 46, followed by the second cut(s) 50. The first and second cuts may be machined cuts that are performed in an automated process. Step c) may include attaching the beam to a vehicle with the mounting brackets 28, as shown in FIGS. 1 and 11. The brackets are attached at a first end 62 to the beam, and at a second end 64 to the vehicle body 26. The trim piece 52 can be slidably engaged in the slot 35. The end caps 30 or 30' can be attached to the extrusion before it is attached to the vehicle body 26.

The above descriptions are those of current embodiments of the invention. Various alterations and changes can be made without departing from the spirit and broader aspects of the invention, which are to be interpreted in accordance with the principles of patent law including the Doctrine of Equivalents.

The embodiments of the invention in which an exclusive property or privilege is claimed are defined as follows:

1. A step tube for attachment to a vehicle comprising one-piece, unitary elongated member having a generally uniform cross section throughout its length, said member including a plurality of upwardly extending ribs, each said rib having a height and a thickness, a majority of said ribs having a height at least twice the thickness, said ribs defining a plurality of channels between said ribs, said ribs and said channels together forming an exposed upper surface of the step tube.

2. The step tube of claim 1 wherein said elongated member includes an end, and an end cap attached to said end, said end cap including a plurality of openings aligned with said channels in said elongated member to allow fluid flow from said channels through said openings and into an environment.

3. The step tube of claim 1 wherein said elongated member includes a first end and a second end, said ribs on said elongated member extending from said first end to said second end.

4. The step tube of claim 1 wherein said ribs extend approximately vertically from said upper surface.

5. The step tube of claim 1 wherein said ribs include a base, and a distal end, said base attached to said upper surface, said thickness tapering toward said distal end.

6. The step tube of claim 1 wherein said ribs include a first rib adjacent an inner surface of the elongated member, a second rib adjacent an outer surface of the elongated member, and a plurality of central ribs between said first and second ribs, said channels each having a width, said height of said central ribs being at least twice said width of said channels between said central ribs, said height of each sequential rib decreasing approaching said inner surface and said outer surface.

7. The step tube of claim 2 wherein said end cap includes an upper surface and a plurality of end cap ribs extending from said upper surface, said end cap ribs aligning with said ribs on said elongated member.

8. The step tube of claim 3 wherein said height of said ribs is uniform between said first and second ends.

9. A step tube for attachment to a vehicle comprising:
a one-piece, unitary extrusion including first and second ends, a longitudinal length, an inner surface an outer surface, and an exposed upper surface having a plurality of ribs extending therefrom, said ribs including a first rib adjacent said inner surface, a second rib adjacent said outer surface, and a plurality of central ribs between said first and second ribs, each of said ribs having a height, said ribs defining a plurality of channels between said ribs, said channels each having a width, said height of said central ribs being at least twice said width of said channels between said central ribs, said ribs and said channels together forming said exposed upper surface of said step tube.

10. The step tube of claim 9 including a pair of end caps covering said ends, said end caps including slots aligned with said channels, wherein said caps include an upper surface having a plurality of end cap ribs, said end cap ribs aligned with said ribs on said extrusion.

11. The step tube of claim 9 further including a trim piece, wherein said extrusion includes an outer surface defining a slot opening, said trim piece secured in said slot opening.

12. The step tube of claim 9 wherein said ribs on said extrusion extend approximately vertically from said upper surface.

13. The step tube of claim 11 wherein said trim piece includes a first end and a second end, said end caps each receiving one of said ends.

14. A step tube for attachment to a vehicle comprising:
a one-piece, unitary extrusion including a longitudinal length, first and second ends, an inner surface, an outer surface adapted to receive brackets for attachment to the vehicle, and an exposed upper surface having a plurality of spaced ribs extending from said surface along said longitudinal length, said ribs defining a plurality of channels between said ribs, at least one of said ribs being a central rib, each of said ribs having a height, said height of each sequential rib decreasing from said at least one central rib toward said inner surface and said outer surface, said ribs and said channels together forming said exposed surface of said step tube.

15. The step tube of claim 14 wherein the step tube includes first and second end caps covering said first and second ends, said first and second end caps including openings aligned with said channels to allow fluid flow through said channels and said openings into an environment.

16. The step tube of claim 14 wherein the heights of said ribs combine to form an arcuate shape.

* * * * *

UNITED STATES PATENT AND TRADEMARK OFFICE
CERTIFICATE OF CORRECTION

PATENT NO. : 7,334,807 B2 Page 1 of 1
APPLICATION NO. : 10/993312
DATED : February 26, 2008
INVENTOR(S) : Craig C. Mulder et al.

It is certified that error appears in the above-identified patent and that said Letters Patent is hereby corrected as shown below:

Column 5, Claim 1, Line 31:
   insert "a" before -- one-piece --

Column 5, Claim 5, Line 52:
   after first occurrence of "base" delete -- , --

Signed and Sealed this

Seventeenth Day of June, 2008

JON W. DUDAS
*Director of the United States Patent and Trademark Office*